United States Patent [19]

Godfrey

[11] 4,164,427

[45] Aug. 14, 1979

[54] STABILIZED HYDROCARBON TACKIFYING COMPOSITIONS

[75] Inventor: Darryl A. Godfrey, Longview, Tex.

[73] Assignee: Eastman Kodak Company, Rochester, N.Y.

[21] Appl. No.: 822,187

[22] Filed: Aug. 5, 1977

[51] Int. Cl.² .................... C08K 5/13; C08K 5/36; C08L 93/04

[52] U.S. Cl. .................... 106/218; 260/27 R; 260/45.95 R

[58] Field of Search ........ 106/218; 260/27 R, 27 EV, 260/45.95

[56] References Cited

U.S. PATENT DOCUMENTS

| | | | |
|---|---|---|---|
| 3,494,947 | 2/1970 | Schutze | 260/45.85 H |
| 3,573,240 | 3/1971 | Flanagan | 260/27 R |
| 3,615,106 | 10/1971 | Flanagan et al. | 260/27 R |
| 3,635,861 | 1/1972 | Russell | 260/27 R |

FOREIGN PATENT DOCUMENTS 1167616  10/1969  United Kingdom ............... 260/27 EV

*Primary Examiner*—Theodore Morris
*Attorney, Agent, or Firm*—Clyde L. Tootle; Daniel B. Reece, III

[57] ABSTRACT

Hydrocarbon tackifying compositions having improved resistance to oxidative degradation are provided by incorporating into the hydrocarbon tackifying composition a stabilizing amount of the combination of 2,2'-methylenebis-(4-methyl-6-tertiarybutylphenol) and dialkylthio ester antioxidants.

8 Claims, No Drawings

STABILIZED HYDROCARBON TACKIFYING COMPOSITIONS

The present invention relates to stabilized hydrocarbon tackifying compositions. More particularly, the present invention relates to the stabilization of hydrocarbon tackifying compositions against oxidative degradation to improve color and molten stability.

Hydrocarbon tackifying compositions are well known in the art and have found wide acceptance in preparation of hot melt adhesives. However, these hydrocarbon tackifiers are unstable when exposed to oxygen, particularly when exposed to oxygen in the presence of heat. This instability to oxygen causes degradation of the hydrocarbon tackifying resin with a loss of physical properties and color problems when used in hot melt applications when the hot melt adhesive is molten for long periods of time.

It is known in the art that various compounds, such as phenolic and amine compounds, can be added to moldable resins and adhesive compositions to improve the oxidative stability of such materials. It is also known that various combinations of these compounds with each other, or with other compounds, can improve the oxidative stability of some hot melt adhesive compositions. However, the stabilization of tackifier resins has not advanced as far in the art as the stabilization of moldable resins and hot melt adhesives. Moreover, these prior art stabilizers and combinations of such stabilizers, however, have not been satisfactory for all applications for which hydrocarbon tackifying resins can be used. For example, some of these stabilizers can be removed from the polymeric compositions containing them by various methods. Such methods include volatilization or extraction during use of the hydrocarbon resin. It would, therefore, be an advance in the state of the art to provide a stabilizer system for hydrocarbon tackifying resins which provides good molten stabilization to hydrocarbon tackifying resins.

Accordingly, it is one object of the invention to provide stabilized hydrocarbon tackifying compositions having good color and melt stability when exposed to elevated temperatures.

Another object of this invention is to provide stabilized hydrocarbon tackifier compositions with improved molten stability when exposed to elevated temperature for extended periods of time.

Another object of this invention is a stabilizer combination useful in hydrocarbon tackifying resins.

Further objects and advantages of the invention will be apparent to those skilled in the art from this disclosure and claims.

In accordance with this invention, it has been discovered that the combination of 2,2'-methylenebis-(4-methyl-6-tertiarybutylphenol) (Ashland CAO-5 antioxidant) and dialkylthiodipropionate possesses a significant ability to protect hydrocarbon tackifying resins against deterioration due to oxygen and heat and that the protection is retained. The result obtained with this particular stabilizer combination was unobvious and unexpected since each of these stabilizing compounds, which have been previously used as antioxidants, when used alone in the amount used together do not provide an effective stabilizer for hydrocarbon tackifying resin. Dialkylthiodipropionate compounds useful in the present invention include the $C_{12}$ to $C_{20}$ dialkylthiodipropionates which can be the same or different alkyl groups. Such dialkylthiodipropionates include distearylthiodipropionate, laurylstearylthiodipropionate, dilaurylthiodipropionate, dimyristylthiodipropionate, and the like.

The amount of 2,2'-methylenebis-(4-methyl-6-tertiarybutylphenol) and the dialkylthiodipropionate incorporated into the hydrocarbon tackifying resin can be varied independently from a very small stabilizing amount up to several percent. More specifically, beneficial results are normally obtained when the ratio of the phenolic compound is in the range of about 1 to 0.15 to 1.5, preferably 1 to 1, and the total stabilizer combination is from about 0.1 percent to about 5 percent by weight of the hydrocarbon tackifying resin, with the preferable concentration being about 0.3 percent to about 3 percent of the hydrocarbon tackifying resin. If the stabilizer is used in an amount of less than 0.3 percent, the hydrocarbon tackifying composition does not possess the longer term stability necessary for all commercial applications. If the stabilizer is used in an amount greater than 5 percent by weight, very little stability is obtained for the increased stabilizer.

The stability system of this invention is useful in any application in which it is desirable to protect the hydrocarbon tackifying resin, such as DAC-B hydrocarbon resin, from deterioration due to oxygen and heat. However, it is expected to find its major use in applications where hot melt adhesives containing DAC-B hydrocarbon resin are held in the molten form for several hours.

The tackifying resins useful in this invention can be a hydrocarbon resin such as DAC-B hydrocarbon resin prepared according to the process disclosed in U.S. Pat. No. 3,701,760, as well as other hydrocarbon resins, synthetic polyterpenes, rosin esters and the like. One such hydrocarbon tackifying resin is a hydrocarbon resin having a softening point of 130° C. and available commercially as Resin H-130 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. Examples of such commercially available resins of this type are Wingtack resins sold by the Goodyear Tire and Rubber Company and the Sta-Tac, Nirez and Betaprene H resins sold by Reichhold Chemical Corporation. Such commercially available resins are sold as "Nirez 1100", "Nirez 1135", "Piccolyte S10", "Piccolyte 40", "Piccolyte 100", or "Piccolyte 135", hydrocarbon resins such as "Piccopale 85", "Piccopale 100".

Also other suitable resins are the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, turpentine, a terpene cut or fraction, and various other terpenes. Particularly useful starting materials are terpene mixtures containing at least 20 percent beta-pinene and/or limonene or dipentene (racemic limonene), and the "sulfate turpentine" obtained as a by-product in the sulfate pulping process. Other suitable tackifying resins are the rosin esters which include ethylene glycol, polyethylene glycol, glycerol and pentaerythritol rosin esters, hydrogenated rosin esters or methylated rosin esters, for example, the commercially available materials Staybelite Ester 3, triethylene glycol ester of hydrogenated rosin, Foral 85 and 105, highly stabilized ester resins of pentaerythritol and rosin base. These tackifying resins preferably have softening points of at least 100° C. and most preferably at least 120° C.

The invention will be further illustrated by the following example although it will be understood that this example is included merely for purposes of illustration and is not intended to limit the scope of the invention.

EXAMPLE

About 99.7% of a DAC-B hydrocarbon resin having a softening point of 100° C. and 0.1% by weight of 2,2'-methylene bis(4-methyl-6-tertiarybutylphenol) and 0.1% dimyristylthiodipropionate are blended in a nitrogen purged mixing flask. The mixing flask is heated with a mantle for 25 minutes at a temperature of about 200° C. until the resin is molten. The resin is stirred for another 15 minutes at a temperature of about 200° C. The stabilized resin composition was tested for stability by heating at 350° F. in an open atmosphere. The following results were obtained with this stabilized composition.

| | Compatability With Polyethylene, Percent Light Transmittance at 525 mμ | | |
|---|---|---|---|
| | Color | Viscosity at 374° F., cps. | Compatibility, % T |
| Initial | 3 | 140 | 96 |
| After 24 hrs. at 350° F. | 11 | 150 | 75 |
| After 48 hrs. at 350° F. | 12 | 200 | 64 |
| After 72 hrs. at 350° F. | 13 | 200 | 47 |
| After 96 hrs. at 350° F. | 16 | 250 | 26 |

The sample DAC-B hydrocarbon resin without the stabilizer combination gave the following results:

| | Compatibility With Polyethylene, Percent Light Transmittance at 525 mμ | | |
|---|---|---|---|
| | Color | Viscosity at 374° F., cps. | Compatibility % T |
| Initial | 2 | 125 | 95 |
| After 24 hrs. at 350° F. | 15 | 190 | 23 |
| After 48 hrs. at 350° F. | 17 | 240 | 1 |
| After 72 hrs. at 350° F. | >18 | 250 | — |
| After 96 hrs. at 350° F. | >18 | 315 | — |

This showing particularly points out the superior color, viscosity and compatibility properties of the stabilized hydrocarbon resin composition.

Similar results were also obtained using distearylthiodipropionate, dilaurylthiodipropionate, laurylstearyl thiodipropionate, in place of the dimyristylthiodipropionate.

Similar results were also obtained using each of the stabilizers in amounts of 0.15% and 0.25%, by weight, and using hydrocarbon resins having softening points of 130° C.

The stabilized hydrocarbon tackifying resin compositions of the present invention provide compositions which can be used in hot melt adhesive compositions having an unexpectedly high stability to oxidative degradation. Such adhesives can be used as carton closing adhesives and in the manufacture of cardboard cartons. Other additives, stabilizers, pigments, dyes and the like can also be added to the stabilized compositions.

Although the invention has been described in considerable detail with particular reference to certain preferred embodiments thereof, variations and modifications can be effected within the spirit and scope of the invention.

I claim:

1. Tackifying resin having improved oxidative stability consisting essentially of a tackifying resin and about 0.1 to about 5 weight percent of the stabilizing combination comprising 2,2'-methylenebis-(4-methyl-6-tertiarybutylphenol) and at least one dialkylthiodipropionate.

2. Tackifying resin composition according to claim 1 wherein said tackifying resin is hydrocarbon tackifying resin.

3. Tackifying resin composition according to claim 1 wherein said tackifying resin is polyterpene tackifying resin.

4. Tackifying resin composition according to claim 1 wherein said tackifying resin is rosin ester tackifying resin.

5. Tackifying resin composition according to claim 2 wherein said hydrocarbon tackifying resin is DAC-B hydrocarbon tackifying resin.

6. Hydrocarbon tackifying resin composition according to claim 5 wherein the ratio of 2,2'-methylenebis-(4-methyl-6-tertiarybutylphenol) to dialkylthiodipropionate is from 0.15 to 1.5 to 1.5 to 0.15.

7. Hydrocarbon tackifying resin composition according to claim 6 wherein said dialkylthiodipropionate is dimyristylthiodipropionate.

8. Hydrocarbon tackifying resin composition according to claim 7 wherein the ratio of 2,2'-methylenebis-(4-methyl-6-tertiarbutylphenol) to dimyristylthiodipropionate is 1 to 1.

* * * * *